(12) United States Patent
Yao

(10) Patent No.: US 10,664,065 B2
(45) Date of Patent: May 26, 2020

(54) TOUCH SENSING APPARATUS

(71) Applicant: CHI HSIANG OPTICS CO., LTD., Zhubei, Hsinchu (TW)

(72) Inventor: Po Hung Yao, Hsinchu (TW)

(73) Assignee: CHI HSIANG OPTICS CO., LTD., Zhubei (TW)

( * ) Notice: Subject to any disclaimer, the term of this patent is extended or adjusted under 35 U.S.C. 154(b) by 31 days.

(21) Appl. No.: 16/000,735

(22) Filed: Jun. 5, 2018

(65) Prior Publication Data
US 2018/0356902 A1   Dec. 13, 2018

Related U.S. Application Data

(60) Provisional application No. 62/515,110, filed on Jun. 5, 2017.

(51) Int. Cl.
| | | |
|---|---|---|
| *G06F 3/044* | (2006.01) |
| *G06F 3/03* | (2006.01) |
| *G06F 3/0354* | (2013.01) |
| *G03B 29/00* | (2006.01) |
| *G06F 3/038* | (2013.01) |
| *G06F 3/041* | (2006.01) |
| *G02B 5/30* | (2006.01) |
| *G06F 3/042* | (2006.01) |
| *G06K 9/22* | (2006.01) |
| *G06T 7/70* | (2017.01) |

(52) U.S. Cl.
CPC ......... *G06F 3/0317* (2013.01); *G02B 5/3083* (2013.01); *G03B 29/00* (2013.01); *G06F 3/038* (2013.01); *G06F 3/0321* (2013.01); *G06F 3/03542* (2013.01); *G06F 3/03545* (2013.01); *G06F 3/044* (2013.01); *G06F 3/0416* (2013.01); *G06F 3/0421* (2013.01); *G06F 2203/0384* (2013.01); *G06F 2203/04105* (2013.01); *G06F 2203/04106* (2013.01); *G06K 9/222* (2013.01); *G06T 7/70* (2017.01); *G06T 2207/10048* (2013.01)

(58) Field of Classification Search
None
See application file for complete search history.

(56) References Cited

U.S. PATENT DOCUMENTS

| | | | | |
|---|---|---|---|---|
| 8,692,212 B1 * | 4/2014 | Craft | ...................... | G06F 3/0317 250/458.1 |
| 2012/0306813 A1 * | 12/2012 | Foerster | ................. | G06K 7/089 345/174 |
| 2017/0262660 A1 * | 9/2017 | Dede | ....................... | G06F 21/44 |

* cited by examiner

*Primary Examiner* — Carl Adams

(57) ABSTRACT

A touch sensing apparatus includes at least one conductive sensing element and a reading device. The conductive sensing element includes a substrate and a conductive sensing layer. The conductive sensing layer is disposed on at least one surface of the substrate. The conductive sensing layer includes a plurality of conductive sensing units and a plurality of transparent conductive wires. An orientation distribution of the conductive sensing units is by a coordinate encoding method to constitute a coding pattern. The coding pattern includes coordinate information. The reading device is actuated on the conductive sensing layer, senses and decodes the coding pattern to analyze the coordinate information. The touch sensing apparatus can perform a digital writing and recording without power supply.

17 Claims, 4 Drawing Sheets

TOUCH SENSING APPARATUS

TECHNICAL FIELD

The present invention relates to a hybrid touch sensing apparatus.

BACKGROUND

At present, displays or electronic products with touch function interface have become quite common and mature. In addition to resistive touch module, via capacitive touch products, users can perform interactive operation by fingers, capacitive touch exclusive pens or electromagnetic induction pens. The sensing capacitor structure and the wire of the conventional touch element are mainly made of a transparent conductive material. When the capacitive touch exclusive pen or electromagnetic induction pen is used for input operation, the capacitive touch exclusive pens or the electromagnetic induction pens must perform an electrical interaction with the capacitive sensing structure on the touch element to have the function of input operation, therefore, the operation with capacitive touch exclusive pen or the electromagnetic induction pen cannot be manipulated on the general paper, a writing interface without power supply or non-electrical to achieve digitalized record and data transmission purpose, so that the conventional analog paper writing media is not able to achieve good integration with electronic digitalized touch products.

SUMMARY

The present invention provides a touch sensing apparatus capable of performing digital writing and recording being supplied with power and meanwhile it could be operated without power as well.

The touch sensing apparatus provided by the present invention includes at least one conductive sensing element. The conductive sensing element includes a substrate and a conductive sensing layer. The conductive sensing layer is disposed on at least one surface of the substrate. The conductive sensing layer includes a coding pattern. The coding pattern includes coordinate information.

In an embodiment of the present invention, the conductive sensing layer includes a plurality of conductive sensing units and a plurality of transparent conductive wires. The coding pattern is formed by the conductive sensing units. An orientation distribution of each of the conductive sensing units is determined by a coordinate encoding method. The conductive sensing units are electrically connected to the transparent conductive wires.

In an embodiment of the present invention, a shape of the conductive sensing unit is a single geometric pattern or a mixture of a plurality of geometric patterns. A material of the conductive sensing unit is selected from one or a combination of indium tin oxide, silver, copper, gold, and a copper-nickel alloy. A material of the transparent conductive wire is selected from one of indium tin oxide, nanosilver and nanocopper. A thickness of the transparent conductive wire is between 10 nm and 5000 nm.

In an embodiment of the present invention, a quantity of the at least one conductive sensing element is two. The two substrates of the two conductive sensing elements are stacked on each other. The conductive sensing unit included in one of the conductive sensing layers is disposed on an upper surface of one of the substrates. The conductive sensing unit included in the other conductive sensing layer is disposed on a lower surface of the other substrate. A position of the conductive sensing unit disposed on the upper surface corresponds to a position of the conductive sensing unit disposed on the lower surface.

In an embodiment of the present invention, the conductive sensing units and the transparent conductive wires are disposed on one of the surfaces of the substrate.

In an embodiment of the present invention, the conductive sensing units and the transparent conductive wires are disposed on two opposite surfaces of the substrate.

In an embodiment of the present invention, a thickness of the conductive sensing layer is between 5 nm and 100 um. A material of the substrate is polyethylene terephthalate, polycarbonate, methylester, polyimide or cycloolefin polymer.

In an embodiment of the present invention, the touch sensing apparatus further includes a reading device configured to actuate on the conductive sensing element and sense and decode the coding pattern to analyze the coordinate information.

In an embodiment of the present invention, the aforementioned reading device includes a light source module, an image sensor, a microprocessor module and a power module. The light source module is configured to emit a light beam. The light beam optically interacts with the conductive sensing units to generate an optical signal. The image sensor is configured to sense the optical signal and output at least one image of the conductive sensing units. The microprocessor module is electrically connected to the image sensor and configured to analyze a variation of the image and decode it to obtain the coordinate information. The power module is configured to provide electric power to the reading device. In an embodiment, the conductive sensing unit generates a reflection or other optical interaction mechanism to an infrared light source, and the optical interaction mechanism includes scattering or absorption. In another embodiment, a fluorescent coating is further disposed on the conductive sensing units, and the optical interaction includes a fluorescence excitation.

In an embodiment of the present invention, the reading device further includes a filter element or a polarizer disposed in front of or behind the light source module.

In an embodiment of the present invention, the reading device includes a thermal image sensor, a microprocessor module and a power module. The thermal image sensor is configured to sense a thermal energy signal generated by the conductive sensing units and output at least one image of the conductive sensing units. The microprocessor module is electrically connected to the thermal image sensor and configured to analyze a variation of the image and decode it to obtain the coordinate information. The power module is configured to provide electric power to the reading device. In an embodiment, the conductive sensing unit generates the thermal energy signal, according to an input of an external low current, due to an intrinsic electrical impedance of the conductive sensing unit.

In an embodiment of the present invention, the aforementioned touch sensing apparatus further includes a protective layer disposed on the conductive sensing element. The reading device further includes a pressure sensor configured to sense a pressure variation caused by the reading device in contact with the protective layer.

In an embodiment of the present invention, the microprocessor module of the reading device includes a communication interface configured to transmit the coordinate information to an external electronic device. In an embodiment, the communication interface is a wireless communication module.

In an embodiment of the present invention, the reading device is a pen type. In an embodiment, the reading device further includes an ink pen tip.

Due to that the present invention uses the conductive sensing units to perform coordinate encoding pattern, the conductive sensing unit is not only an electrically-addressed capacitive sensing unit but further has the feature of coordinate encoding units, so that it can still be used, under the circumstances of no power supply (or power supply fail) supplied to the touch panel, with the reading device to perform a touch input operation.

DETAILED DESCRIPTION OF PREFERRED EMBODIMENTS

Figure 1:
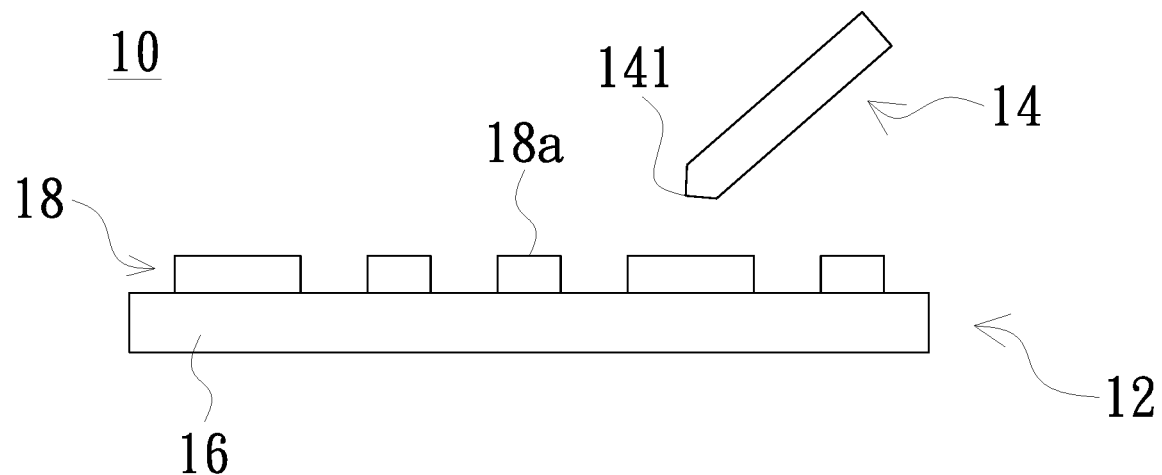
FIG. 1 is a schematic view of a touch sensing apparatus according to an embodiment of the present invention.

FIG. 1 is a schematic view of a touch sensing apparatus according to an embodiment of the present invention. As shown in the figure, the touch sensing apparatus 10 includes a conductive sensing element 12 and a reading device 14. The conductive sensing element 12 includes a substrate 16 and a conductive sensing layer 18. The conductive sensing layer 18 is disposed on one surface of the substrate 16, but is not limited thereto. In other embodiments, the conductive sensing layer 18 may be disposed on two opposite surfaces of the substrate 16. The conductive sensing layer 18 includes a coding pattern 18a. The reading device 14 is used to actuate on the conductive sensing layer 18, such as sliding or moving. The reading device 14 senses the variation of the coding pattern 18a while actuating and decodes it to analyze the coordinate information of the position of the reading device 14, thereby obtaining the actuating route of the reading device 14. In an embodiment, the appearance of the reading device 14 preferably includes a holding component, for example, the reading device 14 is a pen type with a contact end 141 for abutting against or adjacent to the conductive sensing layer 18, so that the users can use the accustomed writing action to interact with the conductive sensing element 12. In order to protect the conductive sensing layer 18, a protective layer (not shown) may be coated on the conductive sensing layer 18. The protective layer may have the function of hardness, scratch resistance, or anti-fouling. In an embodiment, a protective cover (not shown) may also be disposed on the conductive sensing element 12.

Figure 2:
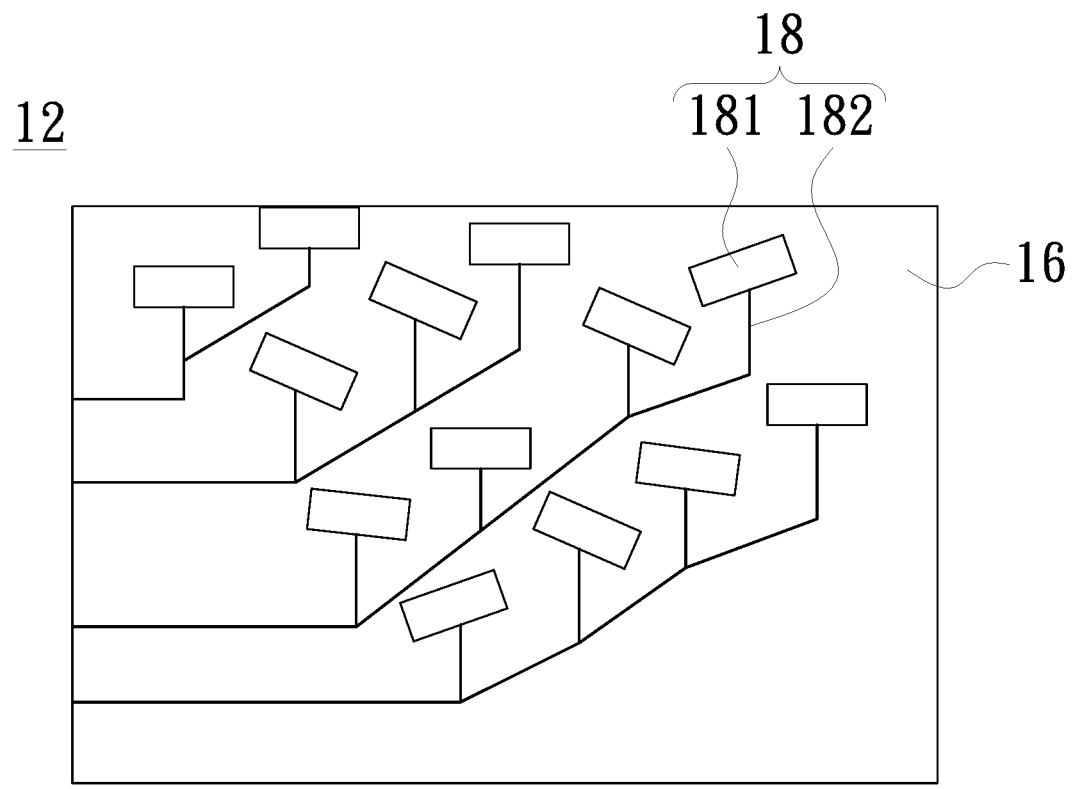
FIG. 2 is a schematic partial top view of a touch sensing apparatus according to an embodiment of the present invention.

Please also refer to FIG. 2. In an embodiment, the conductive sensing layer 18 includes a plurality of conductive sensing units 181 and a plurality of transparent conductive wires 182. The transparent conductive wires 182 are electrically connected to the conductive sensing units 181. The coding pattern 18a is formed by the conductive sensing units 181 on the substrate 16. The coding pattern 18a includes coordinate information. Each conductive sensing unit 181 may be a single geometric pattern, such as a line segment, a circle, an ellipse or a polygon, or a mixture of a plurality of geometric patterns. Preferably, each conductive sensing unit 181 is, for example, an ellipse, which has different lengths of long axis and short axis and has different orientations depending on different inclination angle. The orientation distribution of the conductive sensing units 181 on the substrate 16 is determined by a coordinate encoding method.

Figure 3:
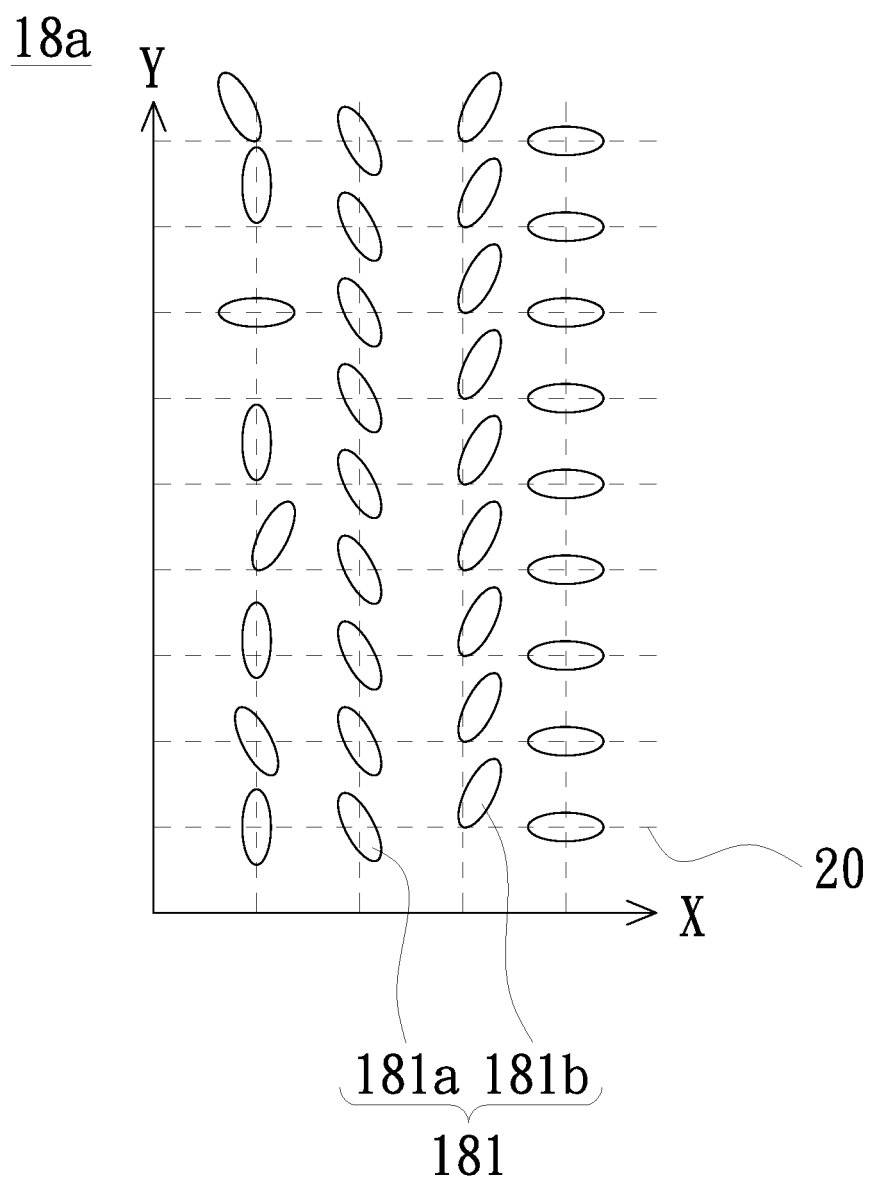
FIG. 3 is a schematic view of a partial configuration of a coding pattern according to an embodiment of the present invention.

FIG. 3 is a schematic view of a partial configuration of a coding pattern according to an embodiment of the present invention. The coding pattern 18a includes virtual grid lines 20 and a plurality of conductive sensing units 181. The virtual grid lines 20 are not actually disposed on the substrate 16, and thus are drawn by dotted lines. In an embodiment, the virtual grid lines 20 intersect perpendicularly to each other to form a plurality of intersections. In the embodiment shown in FIG. 3, the conductive sensing unit 181 is elliptical. The conductive sensing units 181 may include partially identical and partially different orientation patterns, for example, the coordinate pattern of the conductive sensing unit 181 may be a center point of an ellipse at the intersection and disposed on the virtual grid lines 20 vertically or horizontally, or has an decline angle relative to the virtual grid lines 20. Or, the coordinate pattern of the conductive sensing unit 181b may have one of its elliptical ends disposed at the intersection of the virtual grid lines 20 to exhibit an inclination of different angles. The positioning coordinates of a plane position can be compiled by the orientation differences. In addition to the above-mentioned encoding method, the coordinate information also can be implemented by other suitable encoding methods.

The material of the conductive sensing unit 181 may be selected from one or a combination of indium tin oxide, silver, copper, gold and cupro-nickel alloy. The thickness of the conductive sensing layer 18 is between 5 nanometers (nm) and 100 um. The material of the transparent conductive wire 182 is selected from one of indium tin oxide, nanosilver, and nanocopper, and the thickness of the transparent conductive wire 182 is between 10 nm and 5000 nm. The material of the substrate 16 is polyethylene terephthalate (PET), polycarbonate (PC), methyl ester (PMMA), polyimide (PI) or cycloolefin polymers (COP).

Figure 4:
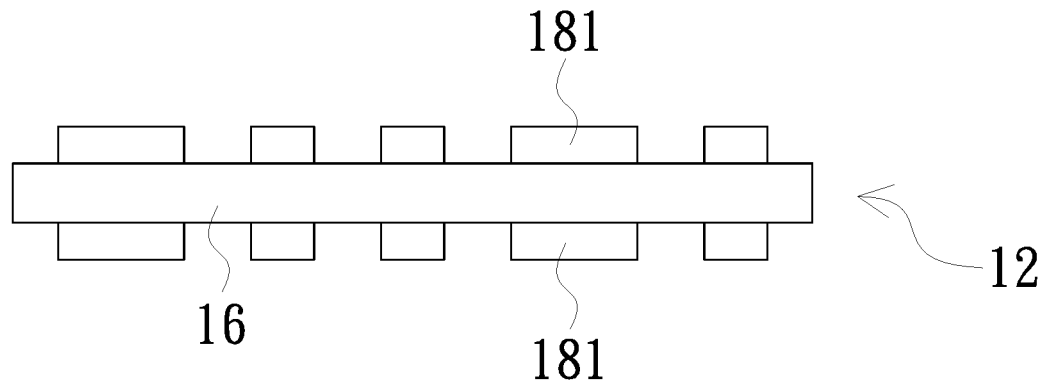
FIG. 4 is a schematic cross-sectional view of a conductive sensing element according to an embodiment of the present invention.
Figure 5:
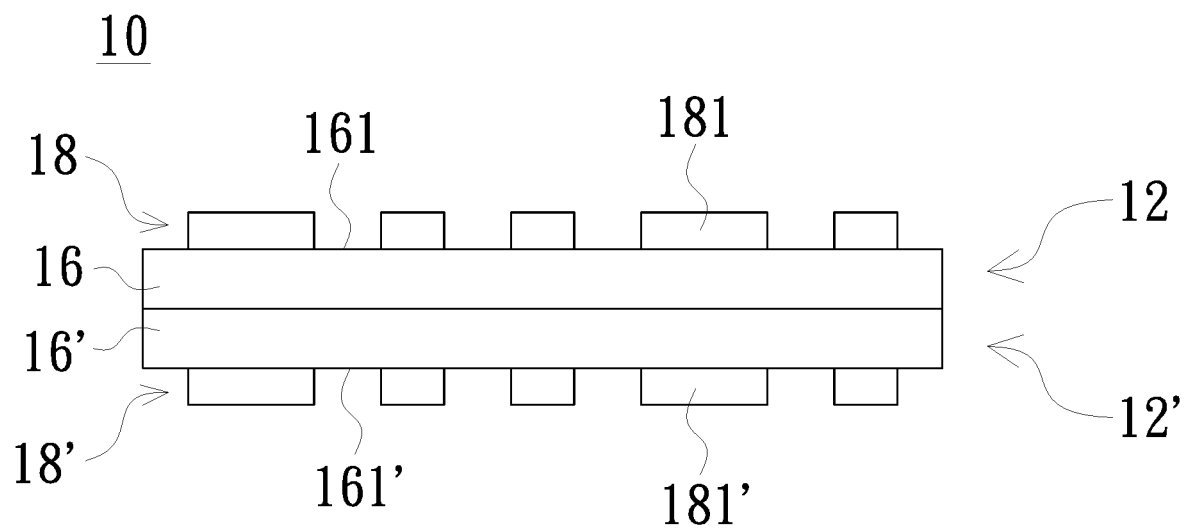
FIG. 5 is a schematic cross-sectional view of a conductive sensing element according to another embodiment of the present invention.

In an embodiment, the conductive sensing element 12 is a single-layer sensing capacitor structure, wherein the conductive sensing units 181 and the transparent conductive wires 182 are disposed on the same surface of the substrate 16 defined as the X and Y coordinates, as the conductive sensing element 12 shown in FIG. 1. In another embodiment as shown in FIG. 4, the conductive sensing element 12 is a double-layer sensing capacitor structure, wherein two sets of the conductive sensing units 181 and the transparent conductive wires 182 (not shown) are disposed on the two opposite surfaces of the substrate 16 to form a single-substrate double-sided sensing capacitor structure. In another embodiment as shown in FIG. 5, the touch sensing apparatus 10 includes two conductive sensing element 12 and 12', each of which includes a substrate 16/16' and a conductive sensing layer 18/18'. The substrates 16 and 16' of the two conductive sensing elements 12 and 12' are stacked on one another, wherein the conductive sensing units 181 included in one of the conductive sensing layers 18 are disposed on the upper surface 161 of one of the substrates 16, and the conductive sensing units 181' of another conductive sensing layer 18' are disposed on the lower surface 161' of the other substrate 16'. The position of the conductive sensing unit 181 disposed on the upper surface 161 and the position of the conductive sensing unit 181' disposed on the lower surface 161' correspond to each other to configure a group of micro-capacitor structure.

Figure 6:
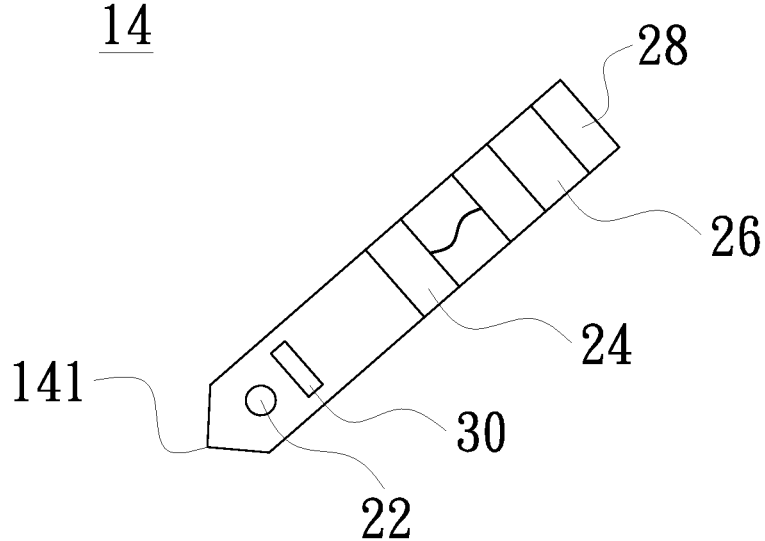
FIG. 6 is a schematic view of a reading device according to a first embodiment of the present invention.

Following the above description, FIG. 6 is a schematic view of a reading device according to a first embodiment of the present invention. As shown in FIG. 6, the reading device 14 includes a light source module 22, an image sensor 24, a microprocessor module 26 and a power module 28. The light source module 22 emits a light beam. When the reading device 14 is actuated on the conductive sensing layer 18, the light beam optically interacts with the conductive sensing units 181 to generate an optical signal. The image sensor 24 is configured to sense and/or receive the optical signal and output an image of the conductive sensing units 181. In an embodiment, the image sensor 24 includes an imaging lens module (not shown). The microprocessor module 26 is electrically connected to the image sensor 24 and configured to analyze the variation of a plurality of images and decode it to obtain the coordinate information, thereby calculating the coordinate variations of a route when the reading device 14 is clicking or writing whereon. The power module 28 provides electric power to the entire reading device 14. In an embodiment, the reading device 14 further includes a filter element 30 or polarizer (not shown) disposed in front of or behind the light source module 22, thereby filtering the stray light of the light source module 22 and allowing the light beam with selected wavelength (or polarization) to optically interact with the conductive sensing units 181.

Corresponding to the reading device 14 of the first embodiment, in an embodiment, the conductive sensing unit 181 is made of a metal material which can generate a high reflection for infrared rays, such as copper, silver, gold or copper-nickel alloy. The light beam generated by the light source module 22 of the reading device 14 and the conductive sensing units 181 generate an optical interaction such as reflection or scattering, and the reflected or scattered light is sensed and/or received by the image sensor 24 as an optical signal. In another embodiment, a fluorescence coating layer (not shown) is further disposed on the conductive sensing units 181, therefore, the light beam generated by the light source module 22 of the reading device 14 and the conductive sensing units 181 generate an optical interaction such as fluorescence excitation, and the resulting fluorescence is sensed and/or received by the image sensor 26 as an optical signal.

In the first embodiment as mentioned above, the light beam emitted by the reading device 14 is optically interacted with the conductive sensing units 181, such as reflection, scattering or fluoresce excitation, etc., to generate an optical signal. The image sensor 26 senses and/or receives the optical signal to obtain the variation of coordinate information (after image interpretation and calculation) representing routes passing through the conductive sensing units 181 (each having the same or different coordinate patterns) when the reading device 14 moves on the conductive sensing element 12, thereby obtaining the required plane coordinate information while performing electronic writing and touch operating. When the conductive sensing element 12 is in a normal operating mode (that is, the conductive sensing element 12 has a current input as a capacitive sensing element), the user can use the finger to approach or touch the conductive sensing units 181 to change its capacitance, and thereby determining the touched position by detecting the variation of the capacitance. When the conductive sensing element 12 is in the normal operating mode with current input, the reading device 14 and the conductive sensing element 12 can also perform interactive operation by electrical signal communication. Further, in an embodiment of the present invention, when no power is applied to drive the conductive sensing element 12, although the function of finger interaction does not work, the user can still perform all the interactive operations via the reading device 14.

Figure 7:
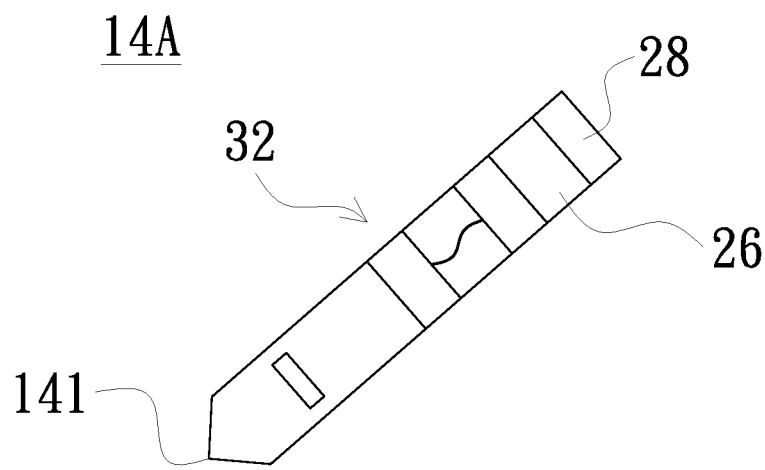
FIG. 7 is a schematic view of a reading device according to a second embodiment of the present invention.

FIG. 7 is a schematic view of a reading device according to a second embodiment of the present invention. As shown in FIG. 7, the reading device 14A includes a thermal image sensor 32, a microprocessor module 26 and a power module 28. The microprocessor module 26 is electrically connected to the thermal image sensor 32. The power module 28 provides electric power to the entire reading device 14A. The reading device 14A is capable of operating the conductive sensing element 12 in a weak current mode (compared to a normal operating mode). The conductive sensing element 12 is only maintained to provide with a low current input without reaching a normal capacitive sensing threshold, but the current can already generate thermal characteristic due to the electrical resistance of the material on the conductive sensing units 181, and the thermal generation range is consistent with the shape of the conductive sensing units 181. When the reading device 14A including the thermal image sensor 32 moves on the conductive sensing element 12, the reading device 14A can capture the image of the conductive sensing units 181 including the coordinate coding meaning by the thermal image sensor 32, and decode and analyze a plurality of images by the microprocessor module 26 to know the coordinate variations of a route, thereby achieving the interactive operation function of the touch sensing apparatus 10.

In an embodiment, the microprocessor module 26 of the reading device 14/14A includes a communication interface (not shown) for transmitting the coordinate information to an external electronic device. In an embodiment, the communication interface is a wireless communication module. The reading device 14/14A further includes a pressure sensor (not shown) for sensing the pressure variation caused by the contact end 141 of the reading device 14/14A while contacting the protective layer or the protective cover on the conductive sensing element 12. In still another embodiment, when the reading device 14/14A is a pen type, an ink pen tip (not shown) is further provided to facilitate writing on the touch sensing apparatus 10 which is not turned on. In addition, when the reading device 14/14A writes on a conventional paper including coordinate patterns of the same encoding principle, it can have the effect of digital recording. Hence the touch technology application can be greatly extended and the digitalization interface can be well integrated for electronic touch devices and the ink writing on papers.

In the embodiment of the present invention, by performing coordinate pattern coded for the conductive sensing unit, the conductive sensing unit is not only an electrically-addressed capacitive sensing unit but further has the characteristics of substantial physical coordinate encoding unit (with specific optical or thermal energy characteristics); therefore, in addition to maintaining traditional touch operation, the touch input operation can still be performed with the reading devices when the touch panel is not powered (or disabled). That is, the present invention has the advantages of performing digital writing and recording when the touch sensing apparatus is under the circumstances of no power supply, and can optimally integrate and extend the traditional analog writing and the digital touch operation.

The above-mentioned statements are merely preferred embodiments of the present invention, and not intended to limit in any form; although the present invention has been disclosed in the above-mentioned preferred embodiments, being not intended to limit the present invention; any technical person skilled in the art, without departing from the technical scope of the present invention, can make some modifications or revisions to the equivalent embodiments by using above-mentioned methods and technical contents; whatever is without departing from the technical scope of the present invention, depending on the technical spirit of the present invention to make any simple modifications, equivalent changes, and revisions are still within the scope of the present invention.

What is claimed is:

1. A touch sensing apparatus, comprising:
    at least one conductive sensing element, comprising a substrate and a conductive sensing layer, wherein the conductive sensing layer is disposed on at least one surface of the substrate, the conductive sensing layer comprises:
        a coding pattern, comprising encoded and coordinate information, and the coding pattern comprising a plurality of virtual grid lines;
        a plurality of conductive sensing units, disposed on the virtual grid lines, wherein a shape of the conductive sensing unit has different lengths of long axis and short axis, and the conductive sensing unit has an orientation depending on an inclination angle between the long axis or the short axis and the virtual grid lines;
        a plurality of transparent conductive wires, wherein the coding pattern is formed by the conductive sensing units, an orientation distribution of each of the conductive sensing units is determined by a coordinate encoding method, and the conductive sensing units are electrically connected to the transparent conductive wires;
    a reading device, configured to actuate on the conductive sensing element and sense and decode the coding pattern to analyze the coordinate information, wherein the reading device comprises:
        a thermal image sensor, configured to sense a thermal energy signal generated by the conductive sensing units and output at least one image comprising the conductive sensing units;
        a microprocessor module, electrically connected to the thermal image sensor, configured to analyze a variation of the image and decode it to obtain the coordinate information; and
        a power module, configured to provide electric power to the reading device.

2. The touch sensing apparatus according to claim 1, wherein a thickness of the conductive sensing layer is between 5 nm and 100 nm.

3. The touch sensing apparatus according to claim 1, wherein a material of the conductive sensing unit is selected from one or a combination of indium tin oxide, silver, copper, gold, and a copper-nickel alloy, a material of the transparent conductive wire is selected from one of indium tin oxide, nanosilver and nanocopper, and a thickness of the transparent conductive wire is between 10 nm and 5000 nm.

4. The touch sensing apparatus according to claim 1, wherein a quantity of the at least one conductive sensing element is two, two substrates of the two conductive sensing elements are stacked on each other, the conductive sensing unit included in one of the conductive sensing layers is disposed on an upper surface of one of the substrates, the conductive sensing unit included in the other conductive sensing layer is disposed on a lower surface of the other substrate, and a position of the conductive sensing unit disposed on the upper surface corresponds to a position of the conductive sensing unit disposed on the lower surface.

5. The touch sensing apparatus according to claim 1, wherein the conductive sensing units and the transparent conductive wires are disposed on one of the surfaces of the substrate.

6. The touch sensing apparatus according to claim 1, wherein the conductive sensing units and the transparent conductive wires are disposed on two of the surfaces of the substrate, and the two surfaces are opposite to each other.

7. The touch sensing apparatus according to claim 1, wherein a material of the substrate is polyethylene terephthalate, polycarbonate, methylester, polyimide or cycloolefin polymer.

8. The touch sensing apparatus according to claim 1, wherein the reading device comprises:
    a light source module, configured to emit a light beam, wherein the light beam optically interacts with the conductive sensing units to generate an optical signal;
    an image sensor, configured to sense the optical signal and output at least one image comprising the conductive sensing units;
    a microprocessor module, electrically connected to the image sensor, configured to analyze a variation of the image and decode it to obtain the coordinate information; and
    a power module, configured to provide electric power to the reading device.

9. The touch sensing apparatus according to claim 8, wherein the conductive sensing units generate an optical interaction mechanism for an infrared light source, and the optical interaction mechanism comprises reflection, scattering or absorbing.

10. The touch sensing apparatus according to claim 8, wherein a fluorescent coating is further disposed on the conductive sensing units, and the optical interaction comprises a fluorescence excitation.

11. The touch sensing apparatus according to claim 8, wherein the reading device further comprises a filter element or a polarizer disposed in front of or behind the light source module.

12. The touch sensing apparatus according to claim 1, wherein the conductive sensing unit generates, according to an input of an external low current, the thermal energy signal due to an intrinsic electrical impedance of the conductive sensing unit.

13. The touch sensing apparatus according to claim 1, further comprising a protective layer disposed on the conductive sensing element, wherein the reading device further comprises a pressure sensor configured to sense a pressure variation caused by the reading device in contact with the protective layer.

14. The touch sensing apparatus according to claim 1, wherein the microprocessor module of the reading device comprises a communication interface configured to transmit the signal of coordinate information to an external electronic device.

15. The touch sensing apparatus according to claim 14, wherein the communication interface is a wireless communication module.

16. The touch sensing apparatus according to claim 1, wherein the reading device is a pen type.

17. The touch sensing apparatus according to claim 1, further comprising a protective layer disposed on the conductive sensing layer.

* * * * *